United States Patent Office 3,051,662
Patented Aug. 28, 1962

3,051,662
PRESSURE-FORMED CATALYST STRUCTURES AND METHOD OF MANUFACTURING SAME
Emory W. Pitzer and Bill T. Morgan, Bartlesville, Okla., assignors to Phillips Petroleum Company, a corporation of Delaware
No Drawing. Filed Oct. 17, 1958, Ser. No. 767,757
14 Claims. (Cl. 252—430)

This invention relates to the forming of finely divided materials into shaped particles. In one aspect, this invention relates to the method for manufacturing shaped articles from finely divided material by compression of the same within a forming means. In another aspect, this invention relates to lubricant-binder compositions for use in forming shaped articles from finely divided material. In another aspect, this invention relates to structures formed by pressure means from finely divided material.

A widely employed method of manufacturing shaped particles or structures from finely divided materials involves subjecting a quantity of the finely divided material to an elevated pressure within a forming means to compress the small particles into a solid mass. In some procedures, tablets are formed by placing powder within a die and compressing the same by movement of opposed reciprocating plungers with sufficient force to cause the particles of powder to adhere together. In other procedures extrudates are formed by extruding the powder by operation of a screw or hydraulic piston through a die with sufficient force that the material extruded through the die is a solid mass of the particles of powder adhered together. These methods have been employed to manufacture many different products such as medicinal pills, catalyst tablets or pellets, and solid rocket propellants.

Usually these procedures have required the addition of a lubricant-binder composition to the powder to be formed in order to reduce wear of the die by movement of the abrasive powders against the surface thereof and to aid in the bonding of the particles into the solid mass to permit ejection thereof from the die without disintegration of the structure formed. The lubricant-binder, which is ordinarily a finely divided solid material, is admixed with the particles of powder to be formed prior to injection into the die. In the subsequent use of the structures formed, it is frequently necessary to remove the lubricant-binder from the structure formed. In such case, the lubricant-binder must be a material which is readily vaporizable by the application of heat or, in some applications, readily removed by combustion. Many materials have been used for this purpose, for example, greases, paraffin wax, soaps, normally solid hydrocarbons such as naphthalene and anthracene, rosin, polytetrafluoroethylene, and hydrogenated vegetable oil, commonly called Sterotex.

Reducing wearing of the die in any of these procedures for manufacturing shaped particles is important not only because the replacement of dies is expensive, but also because the particles eroded from the die contaminate the products produced. Obviously, contamination of a product must be prevented where the product is to be used in medical applications. Where tableting machines are used in the manufacture of the shaped particles, enlargement of the die results in disintegration of the tablets formed in removal from the die.

We have discovered that polymers of aliphatic 1-olefins are excellent lubricant-binder compositions for the production of pressure-formed shaped articles from finely divided material.

An object of this invention is to provide a method for the production of pressure-formed shaped structures from finely divided material.

Another object of this invention is to provide a method for prolonging the life of forming means, such as dies, in the manufacture of pressure-formed shaped structures from finely divided material by the compression of the same.

Another object of this invention is to provide a lubricant-binder for use in the manufacture of pressure-formed shaped articles from finely divided material by compression of the same.

Another object of this invention is to provide a method for tableting finely divided catalytic materials into improved solid catalysts.

Another object of this invention is to provide a pressure-formed shaped article having improved structural rigidity.

Other objects, advantages and features of this invention will be apparent to one skilled in the art upon studying the accompanying disclosure.

According to this invention, there is provided a method for manufacturing pressure-formed shaped articles from finely divided material, said method comprising admixing said finely divided material with polymers of aliphatic 1-olefins in finely divided form and compressing the resulting admixture in a forming means, such as a die, under elevated pressure to form said shaped article.

Also, according to the invention, there is provided a pressure-formed shaped structure comprising a matrix of solid polymer of aliphatic 1-olefin containing finely divided material dispersed therein. In this invention, the matrix can completely envelope the individual particles of the finely divided material; however, usually the individual particles are not completely enclosed so that the adhesion of the particles is the result of pressure used and the surface characteristics of the particles. Of course, a substantial proportion of the particles is completely enclosed by the matrix when the matrix serves solely as a binder and large proportions of the polyolefin are used.

In accordance with this invention, the polymer of aliphatic 1-olefin serves as a lubricant-binder providing a reduction in the wear of the forming die and an increase in the structural rigidity of the shaped article formed. This invention is applicable to the formation of any pressure-formed shaped article such as medicinal pills, catalyst tablets or pellets, solid rocket propellants, and the like. The novel lubricant-binder composition of this invention can be used in any procedure employed for the manufacture of solid shaped structures from finely divided material by the compression of the same and is particularly useful in tableting and extruding operations. The shaped structures which can be formed according to this invention include pills, tablets, pellets, extrudates, and the like.

The binder-lubricant of this invention comprises a solid polymer of aliphatic 1-olefin preferably olefins having from 2 to 8 carbon atoms per molecule and no chain branching nearer the double bond than the four position, such as ethylene, propylene, 1-butene, 1-pentene, 1-octene, 1-hexene, 4-methyl-1-pentene, 4-methyl-1-hexene, and the like. The polymers of ethylene are preferred as lubricant-binders in this invention. Preferably, these polymers have a high density and high crystallinity. These polymers often have a crystallinity of at least 70 percent, preferably at least 80 percent and more desirably at least 90 percent at 25° C. The crystallinity of the polymers can be determined by measurements of nuclear magnetic resonance (Wilson and Pake, Journal of Polymer Science 10, 503 (1953)), using a sample of polymer which is in a state approaching equilibrium at 25° C. An approach to this equilibrium state can be achieved by heating the polymer sample to a temperature of about 50° C. above its crystalline melting point, maintaining the sample at this temperature for about one hour, and then cooling to 25° C. at a rate characterized by fall of about 1.5° C. per minute at 135° C. The softening point of the polymer will vary with the particular polymer used, increasing as the density and crystallinity of the polymer increases. Generally, the softening point of the high density solid polymer is in the approximate range of 240° F. to 270° F. These polymers also often have an inherent viscosity of at least 0.8, preferably an inherent viscosity between 1.2 and about 10, as determined from a solution of 0.2 gram of polymer in 50 cc. of tetralin at 130° C.

Polymers having the above-described properties are preferably produced by the method set forth in U.S. Patent 2,825,721 (1958) of J. P. Hogan and R. L. Banks, filed March 26, 1956. As described in detail in the Hogan and Banks patent, the polymers to be treated in accordance with the present invention can be produced by contacting an aliphatic 1-olefin such as ethylene or propylene or mixtures of ethylene and other unsaturated hydrocarbons, e.g., mixtures of ethylene with minor amounts of monoolefins containing up to and including 6 carbon atoms per molecule, such as propylene, 1-butene and 1-pentene, with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia and thoria. It is preferred that the plastic materials which are to be treated in accordance with this invention be formed from polymers of ethylene produced in accordance with the Hogan and Banks method. The term "polymers of ethylene" as used here is intended to include polymers obtained by polymerizing ethylene and mixtures of ethylene and other unsaturated hydrocarbons.

Other polymers suitable for use as lubricant-binders in this invention can be obtained by other methods, e.g., by proceeding according to the processes disclosed by J. A. Reid in copending U.S. patent application Serial No. 494,281, filed March 14, 1955, now abandoned, and by H. D. Lyons and Gene Nowlin in copending U.S. patent application Serial No. 495,054, filed March 17, 1955. As disclosed in the first of these patent applications, a solid olefin polymer such as a polymer of ethylene, can be produced by contacting ethylene with a catalyst comprising an admixture of an organo-metallic compound such as aluminum trialkyl, and a halide of a group IV metal of the periodic table such as titanium tetrachloride. As disclosed in the latter of the forementioned patent applications, an olefin, such as ethylene, is polymerized in the presence of a catalyst comprising an organo-metallic halide such as ethyl aluminum dichloride, and a halide of a group IV metal, such as titanium tetrachloride, so as to produce a high molecular weight olefin polymer. While it is preferred because of superior properties to employ polymers prepared as described herein above as lubricant-binders in this invention, the invention is also applicable to other types of polyethylene polymers, such as polyethylene polymers having a low density and a low crystallinity.

The particle size of the polymers to be used as a lubricant in this invention in the formation of shaped articles can vary over wide limits depending upon the nature and the size of the finely divided material from which the article is to be shaped and the end use intended for the shaped article. In general, the polyolefin polymer should have a particle size sufficiently small to pass a 40-mesh screen and preferably to pass an 80-mesh screen. Generally speaking, the finer particles of polymer have greater lubricating ability in the shape-forming process. Therefore, it is desirable to have particles passing a 325-mesh screen or a 400-mesh screen. In some applications, such as in the formation of catalysts, it is desirable to use polymers of large particle size in order to provide the shaped article with high porosity and large surface area when the polymer is subsequently removed from the shaped article.

The particle size of the solid materials to be formed into shaped articles by the method of this invention can also vary over wide limits. In general, such particles will be sufficiently small to pass a 40-mesh screen and very often sufficiently small to pass a 400-mesh screen. In some cases, extremely fine particles cannot be formed into shaped structures as easily as those of larger size and, therefore, the optimum particle size will have to be determined.

The proportions of polymers of polyolefins employed in forming the shaped structures of this invention can vary over a wide range, depending upon the composition and particle size of the material being formed and on the material from which the dies are constructed. It is only necessary to provide sufficient polymer to protect the dies from excessive wear, but any excess over this amount is usually not harmful, only uneconomical. Ordinarily, the polymer will amount to from 1 to 25 percent by weight of the finely divided material being formed into the shaped article.

In many applications, the presence of the polyolefin polymer in the final product is desirable as a binder, such as, in medicinal pills and rocket propellant extrudates. However, in other applications, the presence of the polyolefin polymer in the final product is harmful and must be removed. The polymer can readily be removed from the shaped article by heating the article in a gaseous atmosphere. If an inert gas is used, the gas is passed over the heated article and the polymer physically carried off by the stream of gas. In this method of polymer removal, the temperature of the shaped particle should be sufficiently high to effect vaporization of the polymer at least above 300° F. If the gas used is an oxidizing one, such as oxygen or air, the polymer is removed from the shaped article by combustion and usually a temperature in the range of from 800 to 1200° F. is used. In the manufacture of catalysts, a temperature of 1100° F. is preferred for removal of the polymer.

The novel lubricant of this invention is particularly useful in the manufacture of shaped catalytic particles from powdered metal oxides and other metal compounds for use in hydrocarbon conversion processes such as cracking, reforming, hydrogenation, dehydrogenation, polymerization and the like. Such catalysts are sometimes prepared by dry mixing the catalytic components and support, if any, before tableting. In other preparations, the support in finely divided form with or without some of the catalytic components is tableted to form the desired shaped structure and one or more catalytic components added to the catalyst structure by impregnation procedures. The polyolefin polymer lubricant of this invention is particularly adapted to the manufacture of catalysts by these procedures, including catalysts manufactured by depth controlled impregnation of the tableted material such as set forth in the U.S. Patent of J. R. Owen, U.S. 2,606,159 (1952).

A preferred dehydrogenation catalyst which can be prepared using the lubricant of this invention contains approximately 20 weight percent chromia impregnated upon an alumina support in tablet form. Another dehydrogenation catalyst which can be readily manufactured in accordance with this invention is one containing predominantly iron oxide having a small amount of chromium oxide as a stabilizer with a small amount of potassium oxide as a promoter.

The polyolefin lubricant-binder of this invention is particularly useful in the production of solid fuels for the generation of gases in rocket engines. In the manufacture of such solid propellants, the oxidants and fuel materials, including a binder if one is used, are thoroughly admixed together, and extruded through metal dies to form the shaped structure. Examples of oxidants which are sometimes used include ammonium nitrate, ammonium perchlorate, nitrocellulose and potassium perchlorate. Examples of some materials which are used as fuel in such solid propellants include cellulose, nitrocellulose, synethetic rubber, and polyurethane resins. The polyolefins lubricant-binder of this invention permits the shaped structure to be extruded with lower extrusion pressure and produces smoother extrusions free from structural defects affecting the combustion of the propellant.

The lubricant-binder of this invention is also employed in the manufacture of igniters for igniting solid propellants. These igniters are made by compressing finely divided particles of metal and oxidant materials into tablets or pellets using the polyolefins of this invention as a lubricant. Examples of oxidant materials used for this purpose include potassium perchlorate, potassium nitrate, barium nitrate and sodium nitrate. Examples of some metals used for this purpose are aluminum, magnesium, boron, zirconium, titanium, aluminum-magnesium alloy and zirconium-nickel alloy.

EXAMPLE

A catalyst consisting of 40 weight percent $Cr_2O_3$ and 60 weight percent $Al_2O_3$ was prepared by mixing the oxides in a hammer mill making two passes of the material through the mill in order to insure a homogeneous mixture. This material was divided into three portions and two portions were tableted using Sterotex as the lubricant. The other portion was tableted using polyethylene having a density of 0.96 as the lubricant. In each case, the Sterotex and polyethylene lubricants were of a particle size passing a 140-mesh screen and the lubricants amounted to 10 percent by weight of the catalytic material. The catalyst powder and lubricants were mixed and sieved through a 40-mesh screen to insure complete mixing. The mixture was then formed in the standard Stokes single punch tablet press into slugs ¼ inch in diameter and 3⁄16 inch in length. These slugs were ground and sieved to 40–70 mesh and this material was then tableted in the Stokes machine into ⅛ inch tablets. The lubricant was removed from the tablets by calcination at 1100° F. in a stream of air (800 space rate) for 15 hours. Comparisons between the use of the Sterotex and the polyethylene lubricants and the tablets formed are given in the following table:

Table

| Lubricant | Polyethylene | Sterotex | Sterotex |
|---|---|---|---|
| Pressure at Regulator, p.s.i.g. | 200 | 90 | 200 |
| Force on Die [1], lbs | 1,170 | 482 | 1,170 |
| Tablet strength, p.s.i.: | | | |
| Before lubricant removal | 14.9 | 4.9 | 11.4 |
| After lubricant removal | 11.0 | 5.9 | 6.4 |
| Volume of pellets made before damage of dies, cc | over 110 | 78 | 17 |

[1] Calculated from pressure at regulator.

These data clearly demonstrate the superiority of polyethylene as a lubricant in the preparation of catalyst tablets. As shown in the table, the final strength of the tablets using Sterotex as the lubricant was only about half of the strength of the tablets using polyethylene as the lubricant. Also, there was no apparent damage to the dies after forming 110 cc. of tablets using polyethylene as a lubricant whereas the dies were too severely worn for further use when only 17 cc. of tablets had been formed using Sterotex as the lubricant. Even when the force on the dies was reduced to half of that employed using polyethylene as the lubricant, the use of Sterotex permitted the tableting of only a volume of 78 cc. of tablets before the dies were damaged.

Reasonable variation and modification are possible within the scope of the foregoing disclosure and the claims to the invention, the essence of which is that there have been provided (1) a method for the manufacture of pressure-formed shaped structures from finely divided materials using a polymer of an aliphatic 1-olefin as a lubricant-binder and (2) a pressure-formed shaped article having improved properties.

We claim:
1. A pressure-formed shaped article comprising a matrix of a solid polymer of aliphatic 1-olefin containing finely divided solid catalytic material dispersed therein.
2. A pressure-formed catalyst structure comprising a matrix of a solid polymer of aliphatic 1-olefin containing finely divided catalytic material dispersed therein, said solid polymer amounting to less than 25 percent by weight of said catalyst structure.
3. The catalyst structure of claim 2 wherein said solid polymer is a polymer of ethylene.
4. The catalyst structure of claim 2 wherein said solid polymer is a polymer of propylene.
5. A method of manufacturing pressure-formed shaped articles from finely divided solid catalytic material comprising compressing said finely divided solid catalytic material admixed with finely divided polymer of aliphatic 1-olefin.
6. A method of manufacturing pressure-formed shaped articles from finely divided solid catalytic material, said method comprising admixing said finely divided solid catalytic material with finely divided polymer of aliphatic 1-olefin to form an admixture, injecting said admixture into a shaping means, applying an elevated pressure to said admixture within said shaping means to compress said admixture into a shaped article, releasing said elevated pressure, and withdrawing said shaped article from said shaping means.
7. The method of claim 6 wherein said polymer of aliphatic 1-olefin is a polymer of ethylene.
8. The method of claim 6 wherein said polymer of aliphatic 1-olefin is a polymer of propylene.
9. The method of manufacturing a pressure-formed catalyst structure from finely divided solid catalytic material, said method comprising admixing said finely divided catalytic material with finely divided polymer of aliphatic 1-olefin to form an admixture containing less than 25 percent by weight of said polymer, injecting said admixture into a shaping means, applying an elevated pressure to said admixture within said shaping means to compress said admixture into a shaped catalyst structure, releasing said elevated pressure, and withdrawing said catalyst structure from said shaping means.
10. The method of claim 9 wherein said polymer of aliphatic 1-olefin is a polymer of ethylene of a size passing a 40-mesh screen.
11. The method of claim 9 wherein said polymer of aliphatic 1-olefin is a polymer of propylene of a size passing a 40-mesh screen.
12. The method of claim 9 wherein said catalytic material is chromia alumina.
13. The method of manufacturing a pressure-formed catalyst structure from finely divided solid catalytic material, said method comprising, admixing said finely divided catalytic material with finely divided polymer of aliphatic 1-olefin to form an admixture containing less than 25 percent by weight of said polymer, injecting said admixture into a shaping means, applying an elevated pressure to said admixture within said shaping means to compress said admixture into a shaped catalyst structure, releasing said elevated pressure, withdrawing said catalyst structure from said shaping means, and removing said polymer of aliphatic 1-olefin from the catalyst structure formed before use of said catalyst structure.

14. The method of claim 13 wherein said polymer is removed by heating said catalyst structure to an elevated temperature in the presence of a gaseous atmosphere.

References Cited in the file of this patent

UNITED STATES PATENTS

| | | |
|---|---|---|
| 2,624,916 | Persak | Jan. 13, 1953 |
| 2,791,576 | Field | May 7, 1957 |
| 2,840,618 | Hecht | June 24, 1958 |
| 2,930,762 | Schoenenberger | Mar. 29, 1960 |